United States Patent
Tou et al.

(10) Patent No.: US 8,601,258 B2
(45) Date of Patent: Dec. 3, 2013

(54) METHOD FOR CONFIGURING CENTRALIZED ENCRYPTION POLICIES FOR DEVICES

(75) Inventors: Patrick S. Tou, Austin, TX (US); Peter A. DeLine, Austin, TX (US)

(73) Assignee: KIP CR P1 LP, New York, NY (US)

( * ) Notice: Subject to any disclaimer, the term of this patent is extended or adjusted under 35 U.S.C. 154(b) by 1295 days.

(21) Appl. No.: 12/115,218

(22) Filed: May 5, 2008

(65) Prior Publication Data

US 2009/0274300 A1   Nov. 5, 2009

(51) Int. Cl.
*H04L 29/06* (2006.01)

(52) U.S. Cl.
USPC ............ 713/153; 713/193; 726/9; 705/50

(58) Field of Classification Search
USPC ............................................ 713/153; 726/9
See application file for complete search history.

(56) References Cited

U.S. PATENT DOCUMENTS

| | | | |
|---|---|---|---|
| 5,239,437 A | 8/1993 | Hoge et al. | |
| 5,268,802 A | 12/1993 | Bar | |
| 5,651,064 A | 7/1997 | Newell | |
| 6,212,606 B1 | 4/2001 | Dimitroff | |
| 6,658,526 B2 | 12/2003 | Nguyen et al. | |
| 6,732,010 B1 | 5/2004 | Ochs et al. | |
| 6,968,459 B1 | 11/2005 | Morgan et al. | |
| 7,000,085 B2 | 2/2006 | Camble et al. | |
| 7,003,674 B1 | 2/2006 | Hamlin | |
| 7,042,720 B1 | 5/2006 | Konshak et al. | |
| 7,139,147 B2 | 11/2006 | Yasue et al. | |
| 7,155,609 B2 | 12/2006 | Chan et al. | |
| 7,162,496 B2 | 1/2007 | Amarendran et al. | |
| 2002/0004883 A1 | 1/2002 | Nguyen et al. | |
| 2002/0188856 A1 | 12/2002 | Worby | |
| 2003/0074319 A1 | 4/2003 | Jaquette | |
| 2003/0126225 A1 | 7/2003 | Camble et al. | |
| 2004/0078334 A1* | 4/2004 | Malcolm et al. | 705/50 |
| 2004/0103292 A1 | 5/2004 | Shirouzu | |
| 2004/0172550 A1* | 9/2004 | Sai | 713/193 |
| 2005/0071591 A1 | 3/2005 | Goodman et al. | |

(Continued)

FOREIGN PATENT DOCUMENTS

WO  WO03/049361  6/2003
WO  WO 2006/098009 A1  9/2006

OTHER PUBLICATIONS

Kartheesn, "A Policy Based Scheme for Combined Data Security in Mobile ad hoc Networks", 2012, Journal of Computer Science, vol. 8, pp. 1397-1406.*

International Preliminary Report on Patentability for PCT Application No. PCT/US2009/042714, issued Nov. 9, 2010, mailed Nov. 18, 2010, 8 pgs.

(Continued)

*Primary Examiner* — Taghi Arani
*Assistant Examiner* — Gregory Lane
(74) *Attorney, Agent, or Firm* — Sprinkle IP Law Group

(57) ABSTRACT

A data encryption engine and method for using to selectively encrypt communications. Data is received from a source device into the data encryption engine. The data encryption engine determines whether or not to encrypt the data based on a source device preference, a target device preference, a comparison of priority numbers for the source device and target device, the transport medium, the relationship between the source device and target device, a type/level of encryption or some combination. If the data is determined to need encryption, the data encryption device may encrypt the data or may flag the data for encryption by the target device. Otherwise the unencrypted data may be forwarded to the target device.

20 Claims, 4 Drawing Sheets

(56) References Cited

U.S. PATENT DOCUMENTS

| | | | |
|---|---|---|---|
| 2005/0213440 A1 | 9/2005 | Goodman et al. | |
| 2005/0262361 A1 | 11/2005 | Thibadeau | |
| 2006/0013078 A1 | 1/2006 | Goodman et al. | |
| 2006/0085636 A1* | 4/2006 | Osaki | 713/165 |
| 2006/0195704 A1* | 8/2006 | Cochran et al. | 713/193 |
| 2006/0215305 A1 | 9/2006 | Yasue et al. | |
| 2006/0224852 A1 | 10/2006 | Kottomtharayil et al. | |
| 2007/0043958 A1 | 2/2007 | Sasaki | |
| 2007/0106840 A1 | 5/2007 | Estelle et al. | |
| 2007/0206792 A1 | 9/2007 | Saito et al. | |
| 2007/0294753 A1* | 12/2007 | Tanaka et al. | 726/9 |
| 2008/0065903 A1 | 3/2008 | Goodman et al. | |
| 2008/0250204 A1* | 10/2008 | Kavuri et al. | 711/117 |

OTHER PUBLICATIONS

International Search Report and Written Opinion for PCT Application No. PCT/US2009/042714, completed Oct. 26, 2009, mailed Oct. 30, 2009, 12 pgs.

Office Action for U.S. Appl. No. 12/025,181, mailed Jan. 31, 2011, 18 pgs.

Office Action for U.S. Appl. No. 12/025,181, mailed Jul. 8, 2011, 19 pgs.

Office Action for U.S. Appl. No. 12/025,181, mailed Jan. 3, 2012, 22 pgs.

Notice of Allowance for U.S. Appl. No. 12/025,181, mailed Mar. 29, 2012, 5 pgs.

* cited by examiner

| SOURCE | ENCRYPTION PREFERENCE |
|---|---|
| $WWNN_1$ | Y |
| $WWNN_2$ | N |
| $WWNN_3$ | - |

| TARGET | ENCRYPTION PREFERENCE |
|---|---|
| $WWNN_4$ | Y |
| $WWNN_5$ | N |
| $WWNN_6$ | - |

|  110 | 130 | |
|---|---|---|
| SOURCE | TARGET | ENCRYPTION POLICY |
| $WWNN_1$ | $WWNN_4$ | Y |
| $WWNN_1$ | $WWNN_5$ | N |
| $WWNN_1$ | $WWNN_6$ | - |

| 110 | 210 | 510 | 130 | 310 | 520 |
|---|---|---|---|---|---|
| SOURCE | PREFERENCE | PRIORITY | TARGET | PREFERENCE | PRIORITY |
| $WWNN_1$ | Y | 3 | $WWNN_4$ | Y | 2 |
| $WWNN_2$ | N | 2 | $WWNN_5$ | N | 4 |
| $WWNN_3$ | - | - | $WWNN_6$ | N | 1 |

FIG. 5

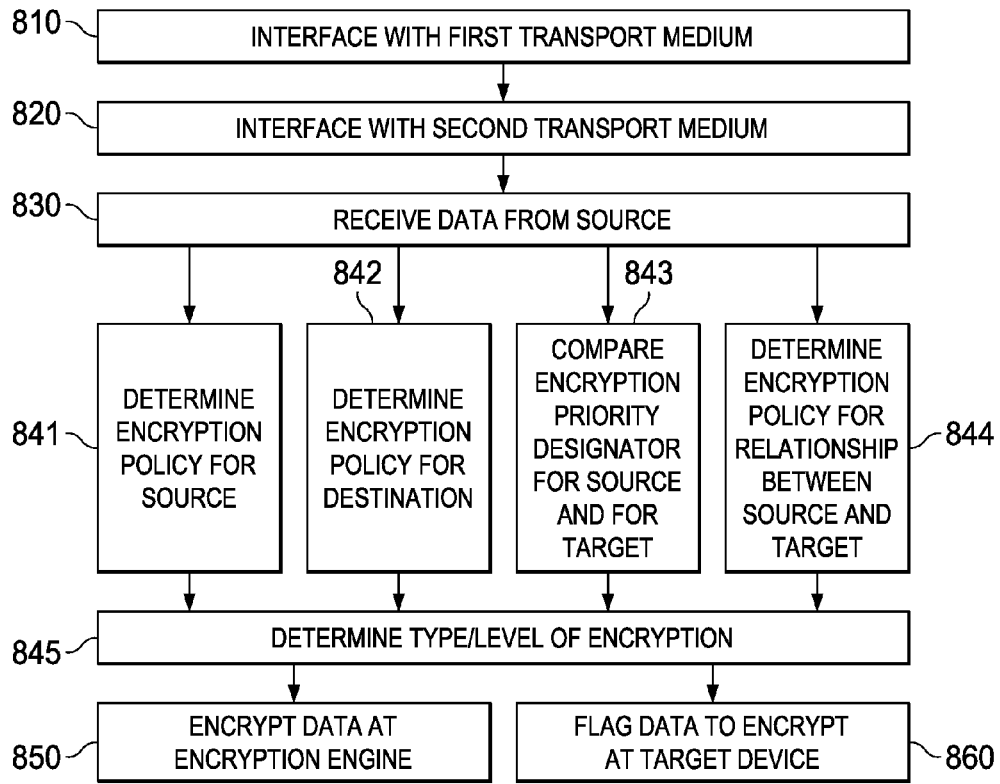
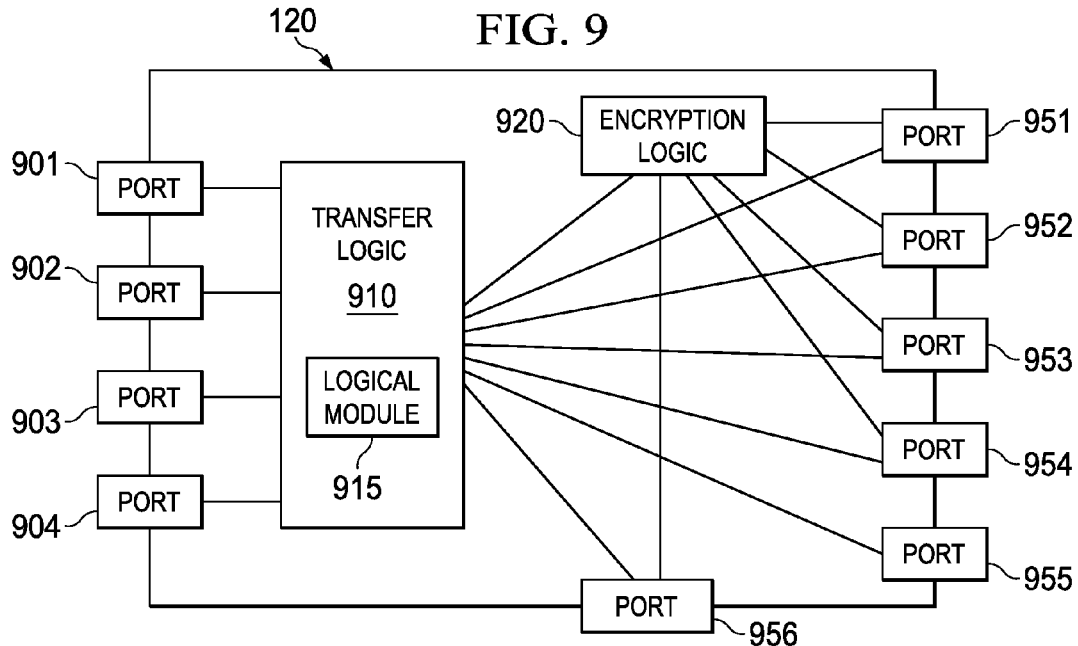

METHOD FOR CONFIGURING CENTRALIZED ENCRYPTION POLICIES FOR DEVICES

FIELD OF THE DISCLOSURE

The present disclosure relates generally to tape backup encryption engines for Fibre Channel devices and more particularly to embodiments of systems and methods for selectively encrypting data.

BACKGROUND

Tape backup generally involves the periodic copying of data from its usual storage device to a tape device so that, in the event of a failure of the hard disk or other storage medium, the data is not lost. Tape backup can generally be accomplished manually or automatically. However, one risk associated with tape backup involves the security of the data. Encryption of data minimizes the risk that data may be retrieved from a tape device. Generally, the encryption of data from a particular initiator device would be encrypted based on an encryption policy set at the initiator device. For a single computer, this may not be a significant problem. However, for large companies or networks of computers, establishing a data encryption policy at each computer or workstation may be time consuming and cost-prohibitive.

SUMMARY

Embodiments disclosed herein enable companies or other entities utilizing networks of computers to establish a centralized encryption policy. The centralized encryption policy may be changed or updated dynamically to ensure security of data on tape backup, and the encryption policy for any source device or target may be updated without the need to be at the source device or target or to access the host or target.

In one embodiment, an encryption product, whether it be a software module or appliance, may be configured to only store some data streams encrypted while storing others unencrypted to a Fibre Channel Storage Area Network device or other device. The decision to encrypt or not encrypt may depend on the identification of the initiator device or destination.

In one embodiment, a policy can be established based on the identifier of the initiator device and/or destination. For Fibre Channel devices, a host may be identified by its World Wide Node Number (WWNN) and World Wide Port Name (WWPN). A target may be identified by its WWNN, WWPN, and Logical Unit Number (LUN). A user may configure a policy that any data stream coming from a specific initiator device be encrypted. Or conversely, any data stream to a particular target device should be encrypted. In one embodiment the policy to encrypt from an initiator device may indicate a different encryption algorithm than the policy for the destination. In one embodiment, data encryption engine manages policy objects and functionally determines the policy decision based on the communicating parties.

In one embodiment, each policy object refers to an initiator or target (identified by its WWNN, WWPN, and LUN), contains the configured encryption policy, and includes a preference rating. The identifying information is used to compare against an initiator and target for a communication. The configured encryption policy can be the suggested policy, and the preference rating is used to determine which of the communication party's policy is preferred. The encryption engine allows addition and removal of policy objects.

In one embodiment, information about the initiator device and the target device are queried against the encryption engine. The identifying information for each party may be used by the encryption engine to search and find the associated policy objects. The policy objects are compared to determine the object with the higher preference rating, or the default policy if an associated policy object is not found. The policy object with the higher preference rating may be used to determine the encryption setting to use.

In some embodiments, a method for implementing encryption may comprise interfacing with a first transport medium, interfacing with a second transport medium, maintaining a centralized encryption policy for a plurality of devices connected to at least one of the first transport medium or the second transport medium, receiving data from an initiator device using the first transport medium and determining whether to encrypt the data based on the centralized encryption policy. If the data should be encrypted based on the centralized encryption policy, the method may include encrypting the data and forwarding the encrypted data to a target device using the second transport medium. If the data should not be encrypted, the method may include forwarding the unencrypted data to the target device. In some embodiments, maintaining a centralized encryption policy includes maintaining a data encryption preference for the initiator device. In some embodiments, maintaining a centralized encryption policy includes maintaining a data encryption preference for the target device. In some embodiments, maintaining a centralized encryption policy includes maintaining an encryption policy for communication between an initiator device and a target device associated with the initiator device so that if the data should be encrypted, the method may include encrypting the data based on the association between the initiator device and the target device. In some embodiments, maintaining a centralized encryption policy may include maintaining a priority designator for the Initiator device, maintaining a priority designator the target device and comparing the priority designator for the initiator device with the priority designator for the target device to determine an encryption policy. If the data should be encrypted, the method may include encrypting the data based on the outcome of the comparison between the priority designator for the initiator device with the priority designator for the target device. In some embodiments, maintaining a centralized encryption policy may include maintaining a designator of a type of data encryption to be performed so that if the data should be encrypted, the method may include encrypting the data according to the designated type of encryption to be performed.

In some embodiments, a system for encrypting information may comprise a plurality of ports for communicating with a plurality of devices, a memory for storing a set of instructions and a processor for executing the set of instructions. The set of instructions may be operable to establish an interface with an initiator device having a first transport medium, establish an interface with a target device having a second transport medium, maintain a centralized encryption policy for a plurality of devices connected to the first transport medium or the second transport medium, receive data from the initiator device destined for the target device using the first transport medium, determine whether to encrypt the data based on the centralized encryption policy, and if the data should be encrypted based on the centralized encryption policy, encrypt the data and forward the encrypted data to a target device connected to the second transport medium. If the data should not be encrypted based on the encryption policy, the unencrypted data may be forwarded to the target device.

In some embodiments, the system is operable to maintain a data encryption preference for the initiator device. In some embodiments, the system is operable to maintain a data encryption preference for a target device. In some embodiments, the system is operable to maintain a data encryption policy for communication between the source device and a target device associated with the source device so that if the data should be encrypted, the system is operable to encrypt the data based on the association between the source device and the target device. In some embodiments, the system is operable to maintain a priority designator for the source device, maintain a priority designator for the target device and compare the priority designator for the source device with the priority designator for the target device to determine an encryption policy. If the data should be encrypted, the system is operable to encrypt the data based on the outcome of the comparison between the priority designator for the source device with the priority designator for the target device. In some embodiments, the system is operable to maintain a designator of a type of data encryption to be performed so that if the data should be encrypted, the system is operable to encrypt the data according to the designated type of encryption.

In some embodiments, a data encryption engine may comprise a memory for storing a set of instructions and a processor for executing the set of instructions. The set of instructions may be operable to establish an interface with a source device having a first transport medium, establish an interface with a target device having a second transport medium, maintain a centralized encryption policy for a plurality of devices connected to at least one of the first transport medium or the second transport medium, receive data from the source device destined for the target device using the first transport medium and determine whether to encrypt the data based on the centralized encryption policy. If the data should be encrypted based on the centralized encryption policy, the data may be encrypted and the encrypted data may be forwarded to a target device connected to the second transport medium. Otherwise, the unencrypted data may be forwarded to the target device. In some embodiments, the system is operable to maintain a data encryption preference for the source device. In some embodiments, the system is operable to maintain a data encryption preference for a target device. In some embodiments, the system is operable to maintain a data encryption policy for communication between the source device and a target device associated with the source device so that if the data should be encrypted, the system is operable to encrypt the data based on the association between the source device and the target device. In some embodiments, the system is operable to maintain a priority designator for the source device, maintain a priority designator the target device, and compare the priority designator for the source device with the priority designator for the target device to determine an encryption policy. If the data should be encrypted, the system is operable to encrypt the data based on the outcome of the comparison between the priority designator for the source device with the priority designator for the target device. In some embodiments, the system is operable to maintain a designator of a type of data encryption to be performed. If the data should be encrypted, the system is operable to encrypt the data according to the designated type of encryption to be performed.

Embodiments disclosed herein may be directed to a method including receiving a fibre channel frame from an initiator containing Small Computing System Interface (SCSI) block data, determining the World Wide Name (WWN) of the initiator from the frame, and determining whether to encrypt data received from the initiator based on an encryption policy associated with the identity of the initiator. If the initiator has an associated encryption policy, the SCSI block data may be encrypted according to the encryption policy and forwarded to a target device. If the initiator does not have an associated encryption policy, the unencrypted SCSI block data may be forwarded to a target device. In some embodiments, the associated encryption policy has an encryption type, wherein if the data should be encrypted, the data is encrypted according to the designated encryption type.

An advantage is that dynamically changeable encryption policies may be based on Fibre Channel identified host and target devices. It allows a policy decision to be made with different configured policies between host and target devices. Encryption policies may be set up so that tape backup may be run automatically without affecting the security of the backup.

BRIEF DESCRIPTION OF THE DRAWINGS

Advantages of the present disclosure will become apparent to those skilled in the art with the benefit of the following detailed description and upon reference to the accompanying drawings in which:

FIG. 4 depicts a table diagram of one embodiment of a data encryption policy;

FIG. 5 depicts a table diagram of one embodiment of a data encryption policy;

FIG. 8 depicts a flow diagram of one embodiment of a method for determining an encryption policy; and FIG. 9 is a diagrammatic representation of one embodiment of an encryption device.

DETAILED DESCRIPTION

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments, examples of which are illustrated in the accompanying drawings. Wherever possible, the same reference numbers will be used throughout the drawings to refer to the same or like parts (elements).

Figures 1, 2, 3:
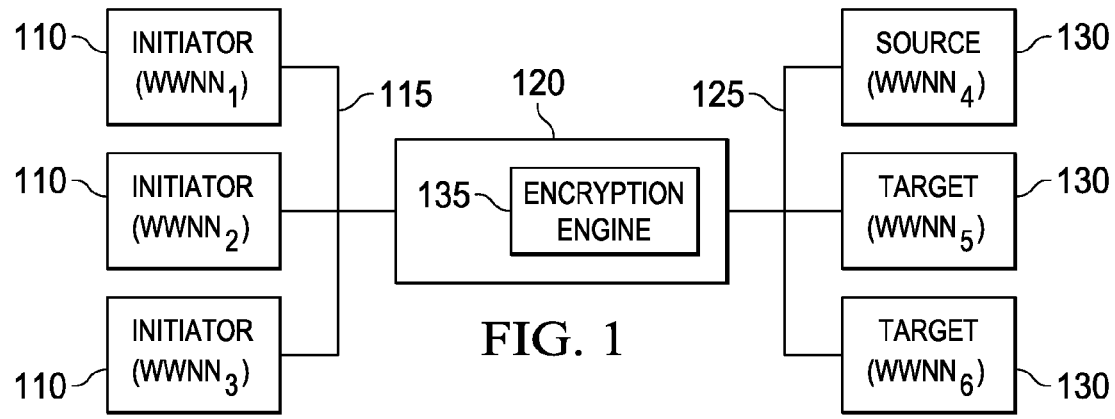
FIG. 1 depicts a block diagram of one embodiment of a data encryption system.
FIG. 2 depicts a table diagram of one embodiment of a data encryption policy.
FIG. 3 depicts a table diagram of one embodiment of a data encryption policy.

FIG. 1 depicts a block diagram of one embodiment of an encryption system Encryption device 120 may communicate with initiator devices 110 using first transport medium 115 and may further communicate with target devices 130 using second transport medium 125. Initiator devices 110 may have an associated MAC address, IP address, GUID, LUN, WWPN, WWNN, or the like. Target devices 130 may include media library, tape drive, HDD drive, optical drive or the like.

Encryption device 120 can include an encryption engine 135 that can be implemented as a set of computer instructions that are executable by a computer processor and stored on one or more computer readable memories (e.g., RAM, ROM, hard drive, magnetic disk drive, optical drive or other computer readable memories known in the art). The term "computer," in this context, means any device with memories and processors capable of storing and implementing a data encryption policy, as would be understood by those of ordinary skill in the art. Examples of computers include PCs, mainframes, routers, servers, portable communications devices or any other device capable of executing computer instructions. The computer instructions can be implemented as software, hardware, firmware or in any other manner known in the art.

Encryption device 120 can connect to initiator devices 110 and target devices 130 by a variety of transport media using various transport protocols. Transport media may include a storage area network, a LAN, a WAN or other network known in the art. Data transport media 125 and 115 can include a variety of media such as SCSI, Fibre Channel, ATA, SATA, iSCSI, Infinibound, Serial Attached SCSI or other transport media. Transport media 115 and 125 can be the same type of transport media or different types of media.

In operation, initiator device 110 can generate commands to write data to target device 130. Encryption device 120 can receive the command and determine whether data associated with the command should be encrypted. This determination can be made based on a variety of factors including, for example, the identity of initiator device 110, target device 130, both the identity of initiator device 110 and target device 130, a priority encryption rating or other factor. According to an embodiment, whether or not data is encrypted can be based on an encryption policy as described in conjunction with FIGS. 2-6.

FIG. 2 is a diagrammatic representation of an initiator device-based data encryption policy object (also referred to as encryption policy 210). An encryption policy 210a for initiator device 110 having a first World Wide Node Name (i.e. $WWNN_1$) may have an associated preference 210 to encrypt data, an encryption policy 210b for initiator device 110 having a second World Wide Node Name (i.e. $WWNN_2$) may have an associated preference to not encrypt data, an encryption policy 210c for initiator device 110 (i.e. $WWNN_3$) may not have an associated preference, etc. As an example, if $WWNN_1$ sends data to $WWNN_5$, encryption device 120 may determine to encrypt the data based on encryption policy 210a for $WWNN_1$ as depicted in FIG. 2. If $WWNN_2$ sends data to $WWNN_4$, encryption device 120 may determine to not encrypt the data based on encryption policy 210b for $WWNN_2$. In some embodiments, a default policy may be determined. Thus, if $WWNN_3$ sends data to target device 130, encryption device 120 may determine based on a default policy to not encrypt because $WWNN_3$ does not have a preference. In some embodiments, encryption device 120 may have encryption policy 210 to use the preference for target 130 if initiator device 110 does not have a preference. For example, if $WWNN_3$ sends data to $WWNN_5$, encryption device 120 may determine to not encrypt the data because $WWNN_3$ does not have a preference and $WWNN_5$ (depicted in FIG. 3) has a preference to not encrypt.

FIG. 3 is a diagrammatic representation of one embodiment of a target device-based data encryption policy object. An encryption policy 310 for target 130 associated with a fourth World Wide Node Name ($WWNN_4$) may have an associated preference 310a to encrypt data, an encryption policy 310b for target 130 associated with $WWNN_5$ may have an associated preference to not encrypt, an encryption policy 310c for target 130 associated with $WWNN_6$ may have an associated preference to not encrypt, and the like. As an example, if $WWNN_1$ sends data to $WWNN_5$, encryption device 120 may determine to not encrypt the data based on encryption policy 310b for $WWNN_5$ as depicted in FIG. 3. If $WWNN_2$ sends data to $WWNN_4$, encryption device 120 may determine to encrypt the data based on encryption policy 310a for $WWNN_4$. In some embodiments, a default policy may be determined. Thus, if $WWNN_3$ sends data to $WWNN_6$, encryption device 120 may determine based on a default policy to not encrypt because neither $WWNN_3$ nor $WWNN_6$ has a preference. In some embodiments, encryption device 120 may have an encryption policy to use the preference for Initiator device 110 if target 130 does not have a preference. For example, if $WWNN_2$ sends data to $WWNN_6$, encryption device 120 may determine to not encrypt the data because $WWNN_6$ does not have a preference and $WWNN_2$ has a preference 210b to not encrypt based on FIG. 2.

FIG. 4 is a diagrammatic representation of one embodiment of a data encryption policy in which data encryption may be dictated by encryption policy 410 based on a relationship between a source device and a target device. Thus, if $WWNN_1$ sends data to $WWNN_4$, encryption device 120 may determine to encrypt the data based on encryption policy 410a, but if $WWNN_1$ sends data to $WWNN_5$, encryption device 120 may determine to not encrypt the data because encryption policy 410b based on the relationship between $WWNN_1$ and $WWNN_5$ does not require encryption. In some embodiments, the relationship between initiator device 110 and target 130 may not have an associated encryption policy. For example, if $WWNN_1$ sends data to $WWNN_6$, encryption engine 135 may not have an associated encryption policy 410c. Encryption engine 135 may use a default encryption policy. For example, encryption engine 135 may determine to encrypt based on the encryption preference for initiator device 110 or target 130.

In some embodiments, a data encryption policy may be determined based on a priority designator 510 for initiator device 110 or priority designator 520 for target 130. FIG. 5 is a diagrammatic representation of one embodiment of an encryption policy object based on the priority designators 510 and 520 for initiator devices 110 or targets 130. As depicted in FIG. 5, an encryption policy for $WWNN_1$ may have a preference 210 to encrypt data and a priority designator 510 of 3, an encryption policy for $WWNN_2$ may have a preference 210 to not encrypt data and a priority designator 510 of 2, an encryption policy for $WWNN_4$ may have a preference 310 to encrypt data and a priority designator 520 of 2, an encryption policy for $WWNN_5$ may have a preference 310 to not encrypt data and a priority designator 520 of 4, and an encryption policy for $WWNN_6$ may have a preference to not encrypt data and a priority designator of 1. In this embodiment, if $WWNN_1$ sends data to $WWNN_5$, encryption device 120 may determine based on an encryption policy to not encrypt the data because the priority designator 510 for $WWNN_1$ (i.e. 3) is less than the priority designator 520 for $WWNN_5$ (i.e. 4). In one embodiment, if $WWNN_3$ sends data to $WWNN_5$, encryption device 120 may determine based on an encryption policy to not encrypt data because $WWNN_3$ does not have an encryption priority designator so the encryption designator for $WWNN_5$ may be the basis for encrypting data. If $WWNN_2$ sends data to $WWNN_4$, encryption device 120 may determine to encrypt or not encrypt based on an encryption policy covering instances when the source device and target device have the same priority designator.

Figures 6, 7:
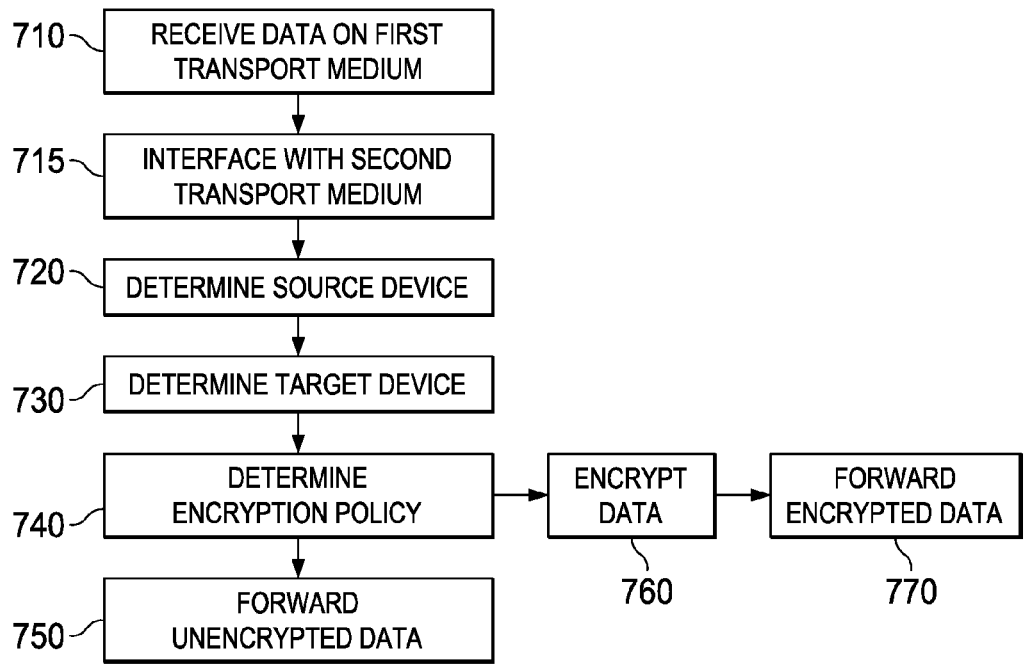
FIG. 6 depicts a table diagram of one embodiment of a data encryption policy.
FIG. 7 depicts a flow diagram of one embodiment of a method for encrypting data.

FIG. 6 is a diagrammatic representation of one embodiment of a data encryption policy in which a type of encryption may be designated. Initiator device 110 associated with $WWNN_1$ may have an encryption policy to encrypt data according to Type 1 encryption 610*a* and initiator device 110 associated with $WWNN_2$ may have an encryption policy to encrypt data according to Type 3 encryption 610*b*. Initiator device 110 associated with $WWNN_3$ may have an encryption policy 210 to not encrypt data. Thus, if $WWNN_1$ sends data to target 130, an encryption policy associated with $WWNN_1$ may require a selected level of encryption, a selected algorithm, or the like. If $WWNN_2$ sends data to target 130, the data may be encrypted according to the encryption policy associated with $WWNN_2$. If $WWNN_3$ sends data to target 130, the data may be encrypted according to a default encryption policy or may be based on an encryption level associated with target 130 because $WWNN_3$ does not have a specified encryption type 610*c*. Those skilled in the art will appreciate that encryption policies may be combined, such as by using information from a combination of FIGS. 2-6. Encryption policies can be maintained as a table, file object, database entry or according to other data storage format. Preferably, encryption policies are maintained in RAM memory or processor caches during operation for speed of access.

FIG. 7 depicts a flow diagram for one embodiment of implementing a data encryption policy. At step 710, data encryption device 120 may receive data associated with initiator device 110 using first transport medium 115. At step 715, data encryption device 120 may interface with second transport medium 125. At step 720, data encryption device 120 may determine initiator device 110 that sent the data. In some embodiments, data encryption device 120 may use one or more of a MAC address, IP address, GUID, LUN, WWNN, WWPN, message authentication code (MAC), a digital signature or other identifier to determine initiator device 110 that sent the data. At step 730, data encryption engine 135 may determine target device 130 for the data. In some embodiments, data encryption engine 135 may use one or more of a MAC address, IP address, GUID, LUN, WWNN, WWPN, message authentication code (MAC), a digital signature or other identifier to determine target device 130 that will receive the data. The identifiers used to identify initiator device 110 and target device 130 can be the same type of identifier or different types of identifier depending on the transport media and can be physical or virtual identifiers. At step 740, data encryption device 120 may determine whether to encrypt the data based on an encryption policy. At step 750, data encryption device 120 may forward unencrypted data to a target device if encryption device 120 has determined the data should not be encrypted. Alternatively, at step 760, data encryption device 120 may encrypt the data according to one or more algorithms if the data should be encrypted. At step 770, encryption device 120 may forward encrypted data to target 130.

FIG. 8 depicts a flow diagram for determining whether to encrypt data received into data encryption device 120. At step 810, encryption device 120 may interface with a first transport medium. At step 820, data encryption device 120 may interface with a second transport medium. At step 830, data encryption device 120 may receive data from initiator device 110 on the first transport medium. Data received by data encryption device 120 may be in an FC Frame format, SCSI packet format, or some other format.

Data encryption engine 135 may determine a data encryption policy. In some embodiments, a centralized data encryption policy may be used to determine whether to encrypt the data or whether to send the data to target device 130 in an unencrypted format. At step 841, data encryption engine 135 may determine from data encryption policy that data sent from initiator device 110 should or should not be encrypted based on a preference of initiator device 110. At step 842, data encryption engine 135 may determine from data encryption policy that data sent to target 130 should or should not be encrypted based on a preference of target 130. At step 843, data encryption engine 135 may obtain priority designators for initiator device 110 and target device 130 and compare the priority designators to determine, based on the comparison, whether or not to encrypt the data. At step 844, data encryption engine 135 may determine that data sent from initiator device 110 to target device 130 should or should not be encrypted due to the relationship between target device 130 and initiator device 110. For example, data encryption engine 135 may determine that all communication from a selected medium should be encrypted, regardless of initiator device 110 or target device 130. At step 845, data encryption engine 135 may determine that data sent from initiator device 110 to target device 130 should or should not be encrypted using a selected type of encryption. Data encryption engine 135 may compare one or more of the data encryption policies associated with initiator device 110, first transport medium 115, second transport medium 125, target 130 or the relationships between them to determine a centralized encryption policy for whether or not to encrypt data.

If data encryption engine 135 determines from centralized data encryption policy that the data should be encrypted, the encryption algorithm may be implemented at data encryption device 120 or at target device 130. The encryption algorithm can include any encryption algorithm known in the art including, but not limited to, the AES-256 encryption algorithm. In some embodiments, the encryption may occur at data encryption device 120 according to the centralized encryption policy. At step 850, if data encryption engine 135 determines from centralized data encryption policy that the data should be encrypted, the encryption algorithm may be implemented at target device 130. At step 860, encryption engine 135 may set a flag to encrypt the data and forward the flagged data to target drive 130 and target drive 130 may encrypt the data. The flag may include information such as what type of encryption should be performed, what algorithm should be used, etc. In some embodiments, block level data may be encrypted so a low level block protocol can be used from initiator device 110 to 130 with the block level data encrypted between.

Data encryption engine 135 can be a router that includes routing and access controls as described in U.S. Pat. Nos. 5,941,972, 6,421,753, 6,425,036, 6,425,035, 6,789,152, 6,738,854, 6,763,419 and 7,051,147, and U.S. patent application Ser. Nos. 11/353,826, 11/851,724, 11/851,775, 11/851,837, 11/980,909 and 11/442,878, each of which is incorporated by reference herein. Data encryption engine 135 can be implemented as software, hardware or firmware or according to any suitable programming architecture.

FIG. 9 is a diagrammatic representation of one embodiment of encryption device 120 in accordance with one embodiment of the disclosure. Encryption device 120 may be an interface between a network and a target device such as media library 130 of FIG. 1. Encryption device 120 may comprise network ports 901-904, transfer logic 910, encryption logic 920 and library ports 951-956. Library ports 951-956 may be coupled to a media library, more specifically library ports 951-956 may be coupled to library components which include drives or media changers. Network ports 901-904 may receive data from one or more networks. Data received at network ports 901-904 is passed to transfer logic 910 which identifies data to be encrypted. Data to be encrypted is forwarded to encryption logic 920 for encryption while data that will not be encrypted is passed to the appropriate library port for transmission to the appropriate drive at a library. Data transferred to encryption logic 920 is encrypted and passed to the appropriate library port for transmission to the appropriate drive. In one embodiment, encryption logic 920 may be implemented utilizing an encryption device such as a PCI card which may be utilized to encrypt data. An example of such a PCI card is the SafeXcel 182-PCI Card, by SafeNet Incorporated. In another embodiment, transfer logic 910 and encryption logic 920 may be implemented utilizing the same device or set of devices, for example, transfer logic 910 and encryption logic 920 may be implemented in firmware on a controller or by software executed by a processor.

More particularly, in one embodiment, commands to a target device may be received at ports 901-904 may be processed at logical module 915 within transfer logic 910. Logical module 915 may parse received data to determine the identity of the target and/or initiator for that data. Based on such a determination at logical module 915, transfer logic 910 may forward data to encryption logic 920 for encryption. While in FIG. 9, logical module 915 is shown as part of transfer logic 910, this is by way of example, not limitation and logical module 915 or the functionality of logical module 915 may be implemented at other locations within an encryption device.

One embodiment of an encryption policy comprises a table which may be, in one embodiment a lookup table or list which may contain the physical or virtual identities of initiators and/or targets to which encryption applies. Commands received from a network may be analyzed by transfer logic 910 utilizing the table of the encryption policy to determine if data received from the network is destined should be encrypted.

It should be noted that because embodiments of compressible data may not be compressible after encryption, encryption device 120 may have the capability to compress data before the data is encrypted. For example, in one embodiment, if transfer logic 910 determines that compressible data is to be sent to a secure cartridge, before encryption at encryption logic 920, the data is compressed. Subsequent to compression, the data is encrypted at encryption logic 920.

Data passed to encryption logic 920 may contain various layers and sections. For example, a packet, frame or other data structure forwarded to encryption logic 920 for encryption may contain a header which allows the packet to be forwarded through one or more portions or sections of a network and a data section which contains data sent from a host to be stored at a library. In one embodiment, encryption logic 920 will encrypt the data section of a packet or frame and will not encrypt the header or other sections of a packet which contain information regarding the destination of the packet.

One embodiment of an encryption device can be an encryption appliance that can allow encryption at line rate speeds. One example of a device in which various embodiments described herein can be implemented is a StrongBox® Tape-Sentry™ Appliance by Crossroads Systems, Inc. of Austin, Tex.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described in the following claims.

What is claimed is:

1. A method for implementing encryption comprising:
   interfacing an encryption device between a first network and a second transport medium;
   maintaining centralized encryption policies at the encryption device for a plurality of devices connected to at least one of the first network or the second transport medium wherein maintaining the centralized encryption policies comprises:
      maintaining priority designators for initiator devices connected to the first network representing encryption priorities for the initiator devices;
      maintaining priority designators for target devices connected to the second transport medium representing encryption priorities for the target devices;
   receiving data from any of a plurality of initiator devices connected to the first network destined for any of a plurality of target devices connected to the second transport medium, the data being received at the encryption device;
   determining, using the encryption device, a centralized encryption policy to apply to the data, wherein said determining comprises:
      identifying a sending initiator device that sent the data;
      identifying a specified target device to which the sending initiator device sent the data; and
      comparing a priority designator for the sending initiator device with a priority designator for a specified target device, wherein the determination of the centralized encryption policy to apply is based on an outcome of the comparison between the priority designator for the sending initiator device with the priority designator for the specified target device;
   if the data should be encrypted based on the determined centralized encryption policy:
      encrypting the data using an encryption engine at the encryption device; and
      forwarding the encrypted data to the specified target device using the second transport medium; and
   otherwise forwarding unencrypted data to the specified target device.

2. The method of claim 1, wherein the centralized encryption policies comprise data encryption preferences for the initiator devices.

3. The method of claim 1, wherein the centralized encryption policies comprise data encryption preferences for the target devices.

4. The method of claim 1, wherein maintaining the centralized encryption policies comprises an encryption policy specific to communications between a first initiator device and a first target device.

5. The method of claim 1, wherein the determined centralized encryption policy comprises:
a designator of a type of data encryption to be performed, wherein the data is encrypted according to the designated type of encryption to be performed.

6. A system for encrypting information comprising:
a plurality of ports for communicating with a plurality of devices;
a processor;
a memory storing a set of instructions the set of instructions executable to:
establish an interface with a plurality of initiator devices over a first network;
establish an interface with a plurality of target devices over a second transport medium;
maintain centralized encryption policies for the plurality of initiator or target devices connected to at least one of the first network or the second transport medium, wherein maintaining the centralized encryption policies comprises:
maintaining priority designators for initiator devices connected to the first network representing encryption priorities for the initiator devices;
maintaining priority designators for target devices connected to the second transport medium representing encryption priorities for the target devices;
receive data at the encryption device from at least one of the plurality of initiator devices connected to the first network destined for at least one of the plurality of target devices connected to the second transport medium;
determine a centralized encryption policy to apply to the data, wherein determining the centralized encryption policy to apply comprises:
identifying a sending initiator device that sent the data;
identifying a specified target device to which the sending initiator device sent the data; and
comparing a priority designator for the sending initiator device with a priority designator for a specified target device, wherein the determination of the centralized encryption policy to apply is based on an outcome of the comparison between the priority designator for the sending initiator device with the priority designator for the specified target device;
if the data should be encrypted based on the determined centralized encryption policy:
encrypt the data using an encryption engine at the encryption device; and
forward the encrypted data to the specified target device; and
otherwise forward unencrypted data to the specified target device.

7. The system of claim 6, wherein the system is operable to maintain a data encryption preference for the at least one of the plurality of initiator devices.

8. The system of claim 6, wherein the system is operable to maintain a data encryption preference for the at least one of the plurality of target devices.

9. The system of claim 6, wherein the system is operable to: maintain a data encryption policy specific to communications between a first initiator device and a first target device.

10. The system of claim 6, wherein the system is operable to: maintain a designator of a type of data encryption to be performed, wherein if the data should be encrypted, the system is operable to encrypt the data according to the designated type of encryption to be performed.

11. A data encryption engine, comprising:
a memory storing a set of instructions; and
a processor for executing the set of instructions, wherein the set of instructions are executable by the processor to:
maintain centralized encryption policies for a plurality of initiator or a plurality of target devices connected to at least one of a first network or second transport medium wherein maintaining the centralized encryption policies comprises:
maintaining priority designators for the plurality of initiator devices connected to the first network representing encryption priorities for the initiator devices:
maintaining priority designators for the plurality of target devices connected to the second transport medium representing encryption priorities for the target devices;
receive data from at least one of the plurality of initiator devices connected to the first network destined for a specified at least one of the plurality of target devices connected to the second transport medium;
determine a centralized encryption policy to apply to the data, wherein determining the centralized encryption policy to apply comprises:
identifying a sending initiator device that sent the data;
identifying a specified target device to which the sending initiator device sent the data; and
comparing a priority designator for the sending initiator device with a priority designator for a specified target device, wherein the determination of the centralized encryption policy to apply is based on an outcome of the comparison between the priority designator for the sending initiator device with the priority designator for the specified target device;
if the data should be encrypted based on the determined centralized encryption policy:
encrypt the data; and
forward the encrypted data to the specified target device connected to the second transport medium; and
otherwise forward unencrypted data to the specified target device.

12. The engine of claim 11, wherein the set of instructions are executable to maintain a data encryption preference for the at least one of the plurality of initiator devices.

13. The engine of claim 11, wherein the set of instructions are executable to maintain a data encryption preference for the at least one of the plurality of target devices.

14. The engine of claim 11, wherein the set of instructions are executable to: maintain a data encryption policy specific to communications between a first initiator device and a first target device.

15. The engine of claim 11, wherein the set of instructions are executable to: maintain a designator of a type of data encryption to be performed, wherein if the data should be encrypted, the set of instructions are executable to encrypt the data according to the designated type of encryption to be performed.

16. A method comprising:
maintaining priority designators for a plurality initiator devices;
maintaining priority designators for a plurality of target devices;
receiving a fibre channel frame from one of the plurality of initiator devices containing Small Computing System Interface (SCSI) block data;

determining a World Wide Name (WWN) of a sending initiator from the fibre channel frame;
determining an identity of a target device to which the sending initiator sent the fibre channel frame; and
comparing a priority designator for the sending initiator with a priority designator for a target device and determining a centralized encryption policy to apply based on an outcome of the comparison between the priority designator for the sending initiator and the priority designation for the target device;
if the data should be encrypted based on the determined centralized encryption policy:
encrypting the SCSI block data; and
forward the encrypted SCSI block data to the target device; and
otherwise forward unencrypted SCSI block data to the target device.

17. The method of claim 16, wherein the determined encryption policy comprises an encryption type, wherein if the data should be encrypted, the data is encrypted according to the designated encryption type.

18. The method of claim 1, wherein the centralized encryption policies are maintained in one or more encryption policy objects.

19. The system of claim 6, wherein the centralized encryption policies are maintained in one or more encryption policy objects.

20. The engine of claim 11, wherein the centralized encryption policies are maintained in one or more encryption policy objects.

* * * * *

UNITED STATES PATENT AND TRADEMARK OFFICE
CERTIFICATE OF CORRECTION

PATENT NO. : 8,601,258 B2
APPLICATION NO. : 12/115218
DATED : December 3, 2013
INVENTOR(S) : Tou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1466 days.

Signed and Sealed this
Fourth Day of August, 2015

Michelle K. Lee
*Director of the United States Patent and Trademark Office*